United States Patent [19]

Griffin

[11] Patent Number: 4,498,736

[45] Date of Patent: Feb. 12, 1985

[54] METHOD AND APPARATUS FOR PRODUCING VISUAL PATTERNS WITH LENTICULAR SHEETS

[76] Inventor: Robert B. Griffin, 282 Tunxis Rd., West Hartford, Conn. 06107

[21] Appl. No.: 230,862

[22] Filed: Feb. 2, 1981

[51] Int. Cl.³ .............................................. G02B 27/00
[52] U.S. Cl. ...................................... 350/167; 356/71; 356/374
[58] Field of Search ................... 350/167, 165; 40/427, 40/454; 356/71, 374

[56] References Cited

U.S. PATENT DOCUMENTS

| | | | |
|---|---|---|---|
| 2,259,395 | 7/1940 | Sachtleben | 351/44 |
| 3,166,625 | 1/1965 | Brumley | 350/167 |
| 3,357,772 | 12/1967 | Rowland | 40/427 |
| 3,653,747 | 4/1972 | Kogelnik | 350/167 |
| 4,070,097 | 1/1978 | Gelber | 350/165 |

Primary Examiner—John K. Corbin
Assistant Examiner—Paul Dzierzynski
Attorney, Agent, or Firm—Prutzman, Kalb, Chilton & Alix

[57] ABSTRACT

A lenticular sheet system having an air gap between a pair of superimposed lenticular sheets which does not diminish or attenuate the spacial optical effect produced by the superimposed lenticular sheets and which is made possible by coating both sides of one of the lenticular sheets with a transparent coating having a coefficient of refraction slightly different than the coefficient of refraction of that sheet.

11 Claims, 3 Drawing Figures

METHOD AND APPARATUS FOR PRODUCING VISUAL PATTERNS WITH LENTICULAR SHEETS

DESCRIPTION

Technical Field

The present invention relates generally to the use of super-imposed lenticular sheets for optically producing striking visual patterns such as asymmetrical or nonlinear moire-like patterns or symmetrical or linear visual patterns and relates more particularly to a new and improved method and apparatus for producing such optical effects without the lenticular sheets being in optical contact through for example direct physical contact or an intermediate wetting agent.

Background Art

An optical system with a pair of superimposed lenticular sheets in optical contact has been employed for producing striking optical effects such as brilliant three dimensional or spacial patterns having an asymmetrical or nonlinear moire-like appearance or a symmetrical or linear appearance. Examples are disclosed in the patents of W. P. Rowland such as U.S. Pat. No. 3,421,805 entitled "Changing Optical Pattern Display"; U.S. Pat. No. 3,357,773 entitled "Patterned Sheet Material"; U.S. Pat. No. 3,312,006 entitled "Motion Displays" and U.S. Pat. No. 3,357,772 entitled "Phased Lenticular Sheets for Optical Effects". That prior art discloses a pair of thin lenticular sheets having embossed patterns of generally hemispherical lenses or lens-like formations. The lenses may be arranged in rows or columns having the same lens pitch and with alternating rows or columns offset by one-half the lens pitch. As described in that prior art, in order to produce dramatic visual effects, the lenses of the two super-imposed lenticular sheets may have different diameters, may be laterally or angularly offset or may have varying diameters. Also, the lenticular sheets may be oscillated or rotated relative to each other to produce changing optical effects or displays, and many different and varied types of lens embossments and patterns may be effectively employed to produce a large variety of different types of striking spacial patterns. However, in all of the known prior art, the lenticular sheet must have good optical contact in order to produce the desired bright visual patterns. Thus, in the prior art systems, the visual pattern would be lost or at least greatly attenuated if, for example, there is an air gap between the pair of superimposed lenticular sheets.

DISCLOSURE OF INVENTION

In accordance with the present invention, a new and improved method and apparatus is provided for producing spacial patterns and optical effects with lenticular sheets without the lenticular sheets being in optical contact and, for example, with an air gap between the lenticular sheets.

The method and apparatus of the present invention greatly facilitates superimposing lenticular sheets in a selective manner, manually or automatically as may be desired in any particular application, without requiring the sheets to be brought into direct optical contact or used with an intermediate optical medium which provides optical contact between the two sheets. Thus, in accordance with the present invention, a large number of different lenticular sheets may be selectively superimposed for selectively producing new and different visual effects and patterns. Also, a lenticular device having a first "standard" lenticular sheet may be employed, for example as a security or identification device for visually identifying whether a second lenticular sheet produces a certain pattern or display and thereby meets a predetermined security or identification test. For example, a lenticular test device employing a first "standard" lenticular sheet having a predetermined design (i.e., a design having a predetermined type and arrangement of lenses) and orientation can be employed to validate or identify a credit card, ticket, identification card, pass or other document. A valid document would be validated by the provision of a second lenticular sheet of predetermined design and orientation and so that when it is placed under the "standard" lenticular sheet, the expected or required visual pattern and pattern colors would be produced. Where the document employs a lenticular sheet having an incorrect or invalid design and/or orientation or does not employ a lenticular sheet, either a visual pattern is not produced or the visual pattern including its coloration is different than that expected or required, in both cases indicating that the document is either invalid or incorrect for the purpose for which it is being tested.

In accordance with the present invention, the overlying lenticular sheet of a two-sheet lenticular display system (i.e., the overlying sheet which is directly viewed for visually observing the produced optical patterns) is specially coated for substantially enhancing the produced spacial display. And it has been found that when the overlying lenticular sheet is coated as provided by the present invention, the overlying lenticular sheet can be spaced from the underlying lenticular sheet (i.e., out of optical contact with the lower sheet) without substantially degrading or attenuating the optical pattern produced. Thus, in accordance with the present invention, an air gap is permitted between the sheets and so that the two sheets may be easily and quickly superimposed to test for and/or produce a spacial optical effect.

BEST MODE FOR CARRYING OUT THE INVENTION

Figure 1:
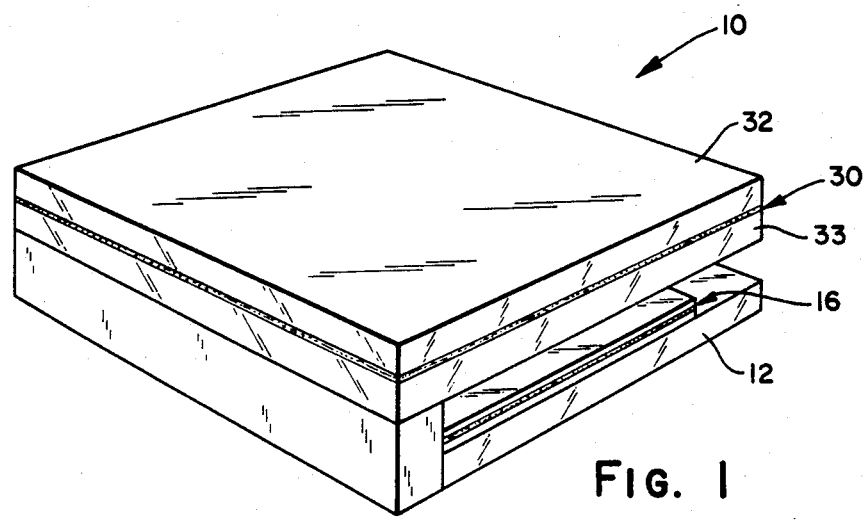
FIG. 1 is a generally perspective view of a lenticular sheet test device incorporating an embodiment of a method and apparatus of the present invention for producing visual patterns with lenticular sheets.
Figure 2:
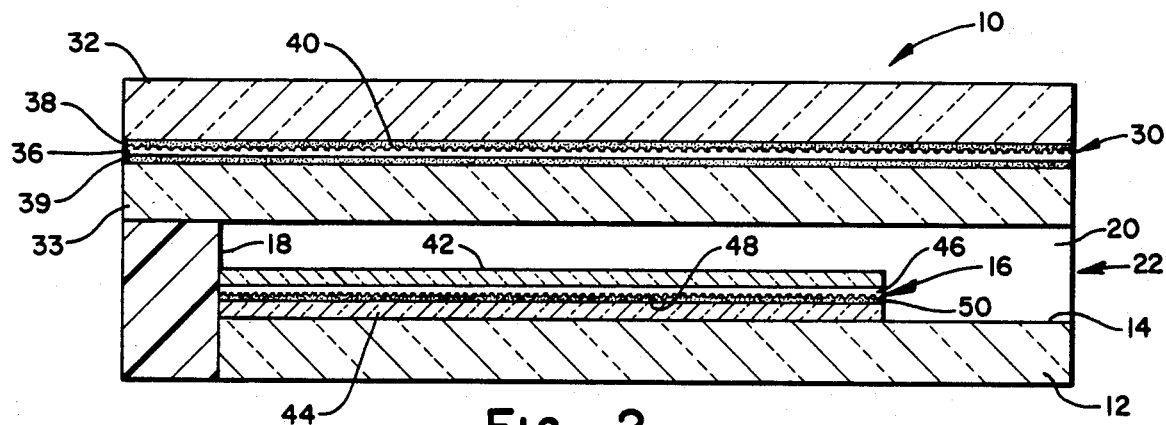
FIG. 2 is an enlarged transverse section view, partly in section, of the lenticular sheet test device.
Figure 3:
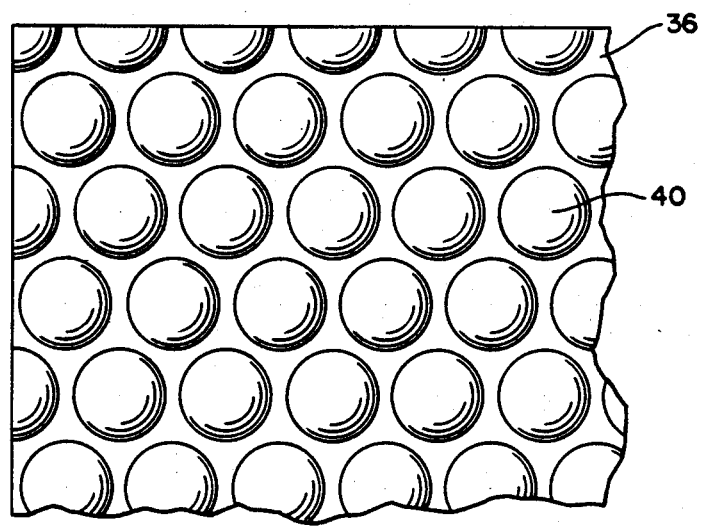
FIG. 3 is an enlarged top plan view, partly broken away, of a lenticular sheet employed in the test device.

Referring now to the drawing in detail wherein like numerals represent like parts throughout, a lenticular sheet test device 10 incorporating an embodiment of a method and apparatus of the present invention for producing visual patterns with lenticular sheets is shown comprising a base 12 with a flat upper support surface 14 for supporting a test document 16 such as a charge or credit card, identification card, pass or ticket etc. to be tested or validated. An upstanding straight edge or sidewall 18 along the left hand edge of the support surface 14 and an upstanding straight edge or backwall 20 at the rear end of the support surface 14 are provided for positioning and aligning a test document 16 inserted within a front slot opening 22 of the device 10. The device 10 further comprises a flat overlying verification or "standard" lenticular lens system 30 which is parallel to and spaced above the flat support surface 14 of the base 12. The overlying lenticular lens system 30 is preferably completely transparent and comprises upper and lower protective plexiglass sheets 32, 33 each having a thickness of, for example one-fourth inch, and an intermediate "standard" plastic lenticular sheet 36, having, for example a thickness of 0.01 inch, sandwiched therebetweeen. The "standard" lenticular sheet 36 is coated on each side thereof by clear and transparent coatings 38, 39 each having for example a thickness of 0.005 inch. The overlying "standard" lenticular sheet 36 is flat on one side and is embossed on its other side to provide a suitable lens pattern 40 having a multiplicity of closely spaced curvilinear lens-like formations, for example as disclosed in any of the aforementioned U.S. Pat. Nos. 3,357,772; 3,120,006; 3,357,773; or 3,421,805. In the embodiment shown in FIG. 2 the overlying sheet 36 is mounted so that its embossed or lenticular side faces outwardly or away from the test document support base 12 but in the alternative the sheet 36 may be mounted with its embossed or lenticular side facing inwardly or toward the test document support base 12.

The lower surface of the upper lenticular sheet 36 is, for example approximately one-half inch and up to one inch above the test document support surface 14 to provide an adequate slot opening to permit the test document to be readily inserted into the slot opening 22 below the overlying lenticular lens system 30.

The test document 16 may be a wallet size card which functions as a charge or credit card, identification card, ticket, pass, etc. Alternatively, for example, the test document can be a larger letter or legal size document (not shown) having a test segment 16 in its upper left hand corner. The test segment 16, if valid, has a predetermined transparent lenticular sheet 46 having for example a thickness of 0.01 inch and which may be the same as or similar to the overlying lenticular sheet 36. Also, the test segment 16 is shown having an upper transparent plastic layer 42 and a lower plastic layer 44 (which may or may not be transparent) for protection of an intermediate lenticular sheet 46 and which preferably provides a relatively rigid flat test document 16 to facilitate handling the document and properly inserting it within the slot opening 22 of the device 10 with its side and front edges in engagement with the sidewall 18 and backwall 20 of the test device.

The lenticular sheet 46 of the test document 16 is preferably mounted with its embossed or lens side on its underside as it is inserted in the device.

In the disclosed embodiment, lenticular sheets 36, 46 are used which are like the lenticular sheet described in detail in aforementioned U.S. Pat. No. 3,357,772. However, those skilled in the art will appreciate that many different and varied types of lens-like embossments or formations may be employed effectively within the teachings and concepts of the present invention and that the disclosed embodiment is merely illustrative of one of many variant types of embossed patterned materials which may be used to carry out the teachings of the present invention.

To produce a striking visual effect, the two superimposed sheets 36, 46 are preferably positioned or oriented with their lens patterns out of alignment. The degree of non-alignment of the lens patterns and the consequent phasing in and out of axial registry of the embossments on the overlying sheet 36 with respect to the embossments on the underlying sheet is preferably controlled to ensure optimum reflection or retroreflection over a wide angle of incident light in at least some areas of the sheets 36, 46.

An aluminum coating 48 is preferably applied to the embossed surface of the lower or underlying lenticular sheet 46 (i.e. as described in aforementioned U.S. Pat. No.3,357,772) to provide a highly reflective coating. Also, a filler coating 50 is preferably applied to the embossed surface over the reflecting coating 48 for protecting the reflective coating.

As indicated, the upper protective layer 42 of the test document 16 as well as its lenticular sheet 46 are made transparent and such that light is reflected upwardly through the lenticular sheet 46 from the reflective coating 48 on the underside of the sheet.

Alternatively, a reflective coating 48 is not provided and the entire test card 16 including both outer protective layers 42, 44 and the filler coating 50 are transparent (except for example for any localized printing, etc. provided on either or both protective layers) and the base 12 of the test device 10 is also made transparent and suitable back lighting (not shown) is provided below the base 12 for transmitting light upwardly through the test card 16 and then through the overlying lenticular lens system 30. Also, such an alternative system may be employed with a transparent test card 16 having its embossed or lens formations on its upper surface facing the overlying lens system 30.

Various synthetic plastics may be used for the lenticular sheet material of the present invention, including acrylic acid esters such as methyl methacrylate, cellulose acetate, cellulose acetate-butyrate, cellulose propionate, vinyl chloride and copolymers thereof, polystyrene polycarbonates, cellulose nitrate, polypropylene and polyethylene.

As described more fully hereinafter, notwithstanding the presence of an air gap of ¼ inch or more between the upper surface of the test card 16 and the overlying lenticular lens system 30 or a distance of up to one inch between the upper surface of the lower lenticular sheet 46 and the lower surface of the overlying lenticular sheet 36, a bright and striking optical effect is produced by the two superimposed lenticular sheets 36, 46 which is visible from above the overlying lenticular lens system 30. In other words, when the lenticular sheet 46 employed in the test card 16 and the lenticular sheet 36 employed in the overlying lenticular lens system 30 are compatable for producing a spacial optical effect, notwithstanding the intermediate air gap and substantial spacing between the lower and overlying lenticular sheets 36, 46 such an optical effect is produced. Also, since the optical effect produced with any given overlying lenticular sheet 36 is dependent on the type of underlying sheet 46 employed and its orientation relative to the overlying sheet 36 and therefore its orientation to the aligning edges 18, 20 of the test device 10, the test device 10 can be employed to visually determine if each inserted test card 16 meets those two requirements. If the test card 16 fails to meet either requirement, the test document is readily identified as being inappropriate, invalid or incorrect, etc.

In accordance with the present invention, it has been found that a transparent coating 38 on the embossed side of the overlying lenticular sheet 36 and another coating 39 of either the same or a different transparent material on the opposite or flat side of the lenticular sheet 36 together provide for greatly enhancing the optical effect provided by the two lenticular sheets 36,46 when they are spaced apart as described. Although the particular coating material used has been found to be important, several different coating materials have been found to provide good results. For example, a clear epoxy coating on both sides of the overlying lenticular sheet 36 has been found to provide good results with both cellulose propionate and polycarbonate lenticular sheets. A clear epoxy coating employing a modified cycloaliphatic amine hardener and an epichlorohydrin and bisphenol-A reaction product (sold under the trademarks "Dow 331" and "Araldite 507") has been found to provide an exceptionally enhanced optical effect and so that it is believed that the optical enhancement provided by the two surface coatings 38,39 is very dependent on the material used. However, the thicknesses of the coatings 38,39 have not been found to be critical, and coatings up to 0.005 inches thick or more have been found to be satisfactory.

It is believed that the optical enhancement provided by the coatings 38,39 may depend on their relative refractive indexes to the refractive index of the lenticular sheet 36. Also, it is believed that the less the difference between the refractive indexes of the lenticular sheet 36 and the coatings 38, 39, the greater the optical enhancement provided. Also, it is believed that the coatings 38,39 provide optical coatings for reducing the diffuse light reflection (possibly by absorbing) and resulting stray radiation which otherwise obscures or dilutes the spacial optical effect and thereby the coatings 38, 39 enhance the relative brightness of the optical effect produced. In other words, the coatings 38, 39 intensify the optical result by increasing the relative light efficiency of the focused light in contrast to the non-focused scattered or diffuse light reflected from the test card 16. Although each coating 38,39 would by itself intensify or enhance the optical effect, both coatings 38, 39 and most surprisingly the coating 39 on the flat surface of the overlying lenticular sheet 36 have been found to be essential in order to produce the desired clear optical spacial effect with brilliant coloration.

In general, it is understood that epoxy coatings have an index of refraction in the range of about 1.49 to 1.59 and that an epoxy coating based on a bisphenol-A epoxy resin has an index of refraction of about 1.57 depending on the hardener employed. Also, it is understood that a cellulose propionate plastic has an index of refraction of between 1.46 to 1.48 dependent on the plasticizer content. An epoxy coating based on a bisphenol-A epoxy resin has been found to be very effective in enhancing the optical spacial effects of the described two sheet lenticular system where lenticular sheets 36, 46 of cellulose are employed, thus indicating that the index or refraction of the coating should be different and probably greater than and yet close to the index of refraction of the lenticular sheet 36 to produce the desired optical enhancement.

As will be apparent to persons skilled in the art, various modifications, adaptations and variations of the foregoing specific disclosure can be made without departing from the teachings of the present invention.

I claim:

1. A display device forming a visible moire-like optical pattern comprising:
    a first lenticular sheet adapted for cooperation with a corresponding second lenticular sheet to form a visible moire-like optical pattern, said first sheet bearing a pattern of closely spaced lens-like embossments on a first surface thereof, the opposed second surface of said first sheet being smooth;
    a second lenticular sheet adapted for cooperation with said first lenticular sheet to form a visible moire-like optical pattern, said second sheet being transparent and bearing a pattern of closely shaped lens-like embossments on a first surface thereof, the opposed second surface of said second sheet being smooth;
    a first transparent optical intensification coating on said first surface of said second sheet, said first coating filling the spaces between said lens-like embossments and being of sufficient thickness to cover said embossments, said first coating having an outer surface, said first coating having a refractive index which is different than the refractive index of said second sheet;
    a second transparent optical intensification coating on said second surface of said second sheet, said second coating having a refractive index which is different than the refractive index of said second sheet; and
    means for supporting said first and second sheets in spaced apart parallel relationship with an air gap therebetween to form a moire-like pattern visible outwardly from said transparent second sheet.

2. A display device according to claim 1 wherein said supporting means includes means for removably supporting said first sheet relative to said second sheet.

3. A display device according to claim 1 wherein said supporting means includes means for transmitting light through said first sheet to said second sheet.

4. A display device according to claim 3 wherein said supporting means is transparent to allow the transmission of light.

5. A display device according to claim 1 which comprises a reflective coating on said first surface of said first sheet to reflect light through said first sheet to said second sheet.

6. A display device according to claim 1 wherein the refractive index of the second lenticular sheet and each of said first and second coatings are less than 1.50 and greater than 1.55 respectively.

7. A display device according to claim 1 or 6 wherein said first lenticular sheet has its embossed surface facing away from said second sheet and further comprising a reflective coating on the embossed surface of said first lenticular sheet.

8. A display device according to claim 1 or 6 wherein the refractive index of said second lenticular sheet and each of said first and second coatings are less than 1.48 and between 1.49 and 1.59 respectively.

9. A display device according to claim 1 or 6 wherein said second lenticular sheet is made of cellulose propionate and said first and second coatings on each side thereof are comprised of an epoxy.

10. A method for visually verifying the authenticity of a test document comprising:
    providing a test document having a lenticular sheet having a pattern of a multiplicity of closely spaced lens-like embossments on one surface and a substantially planar opposite surface;
    providing a standard lenticular sheet having a pattern of a multiplicity of closely spaced lens-like embossments on one surface and a substantially planar opposite surface, the standard lenticular sheet having a transparent optical intensification coating on each surface thereof;

positioning the test lenticular sheet parallel to the standard lenticular sheet and spaced apart from the standard lenticular sheet in a pre-established relative orientation thereto so that an air space is defined between the test lenticular sheet and the standard lenticular sheet;

observing a visual effect produced by a light source incident on the lenticular sheets; and comparing the visual effects to a predetermined moire-like pattern.

11. A device for verification of the authenticity of a test document, the test document comprising a lenticular sheet having a pattern of closely spaced lens-like embossments on a first surface and a substantially planar oppositely disposed second surface, said device comprising:

a verification lenticular sheet, said verification sheet being transparent and having a pattern of closely spaced lens-like embossments on a first surface and a substantially planar oppositely disposed second surface;

a first transparent optical intensification coating on said first surface of said verification sheet, said first coating filling the spaces between said lens-like embossments and being of sufficient thickness to cover said embossments, said first coating having an outer surface which is substantially parallel to said verification sheet second surface, said first coating having a refractive index which is different than the refractive index of said verification sheet;

a second transparent optical intensification coating on said second surface of said verification sheet, said second coating having an outer surface which is substantially parallel to said verification sheet second surface; said second coating having a refractive index which is different than the refractive index of said verification sheet;

base means, said base means defining a planar surface for support for a test document to be verified; and support means, said support means positioning said verification sheet in registration with and spaced from said base means, said support means cooperating with said base means to define a test document receiving slot between said verification sheet and said base means, said slot being sufficiently wide to define an air gap between a test document on said base means and said verification sheet, said support means supporting said verification sheet such that the said second surface thereof is substantially parallel to a test document supported on said base means whereby light passing through the lens-like embossments on a test document supported on said base means will traverse said air gap when a test document is viewed through said verification sheet and the optical intensification coatings thereon.

* * * * *